United States Patent
Bulat et al.

(10) Patent No.: US 10,487,946 B2
(45) Date of Patent: Nov. 26, 2019

(54) SYSTEM FOR REMOVING SEALING FROM A BALL JOINT

(71) Applicant: MILTON ROY EUROPE, Pont-Saint-Pierre (FR)

(72) Inventors: Stephane Bulat, Avron (FR); Arnaud Alex, Moigny sur Ecole (FR)

(73) Assignee: MILTON ROY EUROPE, Pont-Saint-Pierre (FR)

( * ) Notice: Subject to any disclaimer, the term of this patent is extended or adjusted under 35 U.S.C. 154(b) by 0 days.

(21) Appl. No.: 15/507,447

(22) PCT Filed: Aug. 28, 2015

(86) PCT No.: PCT/EP2015/069766
§ 371 (c)(1),
(2) Date: Feb. 28, 2017

(87) PCT Pub. No.: WO2016/030515
PCT Pub. Date: Mar. 3, 2016

(65) Prior Publication Data
US 2017/0284548 A1    Oct. 5, 2017

(30) Foreign Application Priority Data
Aug. 29, 2014   (EP) ..................................... 14182889

(51) Int. Cl.
*F16J 15/3236*      (2016.01)
*B01F 7/00*         (2006.01)
(Continued)

(52) U.S. Cl.
CPC ....... *F16J 15/3236* (2013.01); *B01F 7/00941* (2013.01); *B01F 15/00006* (2013.01);
(Continued)

(58) Field of Classification Search
CPC .................. F16J 15/3236; F16J 15/061; B01F 15/00681; B01F 2015/00097
See application file for complete search history.

(56) References Cited

U.S. PATENT DOCUMENTS 2,612,391 A    9/1952   Boutros
3,028,183 A *  4/1962   Phillips ..................... C22B 9/20
                                                    277/507
(Continued)

FOREIGN PATENT DOCUMENTS

DE    102009025599         12/2010
JP    63182025 A  *  7/1988  ................ B01F 7/22
(Continued)

OTHER PUBLICATIONS

International Search Report, dated Nov. 10, 2015, from corresponding PCT application.

*Primary Examiner* — Eugene G Byrd
(74) *Attorney, Agent, or Firm* — Young & Thompson

(57) ABSTRACT

Disclosed is a stirring device (D) including a screw shaft (1) driven by a drive unit, the screw shaft (1) being guided with respect to a body by way of a bearing, the stirring device furthermore including a seal (8) rigidly secured to the body and in contact with the ball joint (7) so as to ensure sealing with respect to the fluid to be stirred. The seal (8) is mounted on a seal holder (9), the seal holder (9) including a contact region (10) and being able to take up two positions, a first, operating position in which the seal (8) is in contact with the ball joint (7), and a second, maintenance position in which the contact region (10) is in contact with the ball joint (7).

18 Claims, 2 Drawing Sheets

Figure 1:
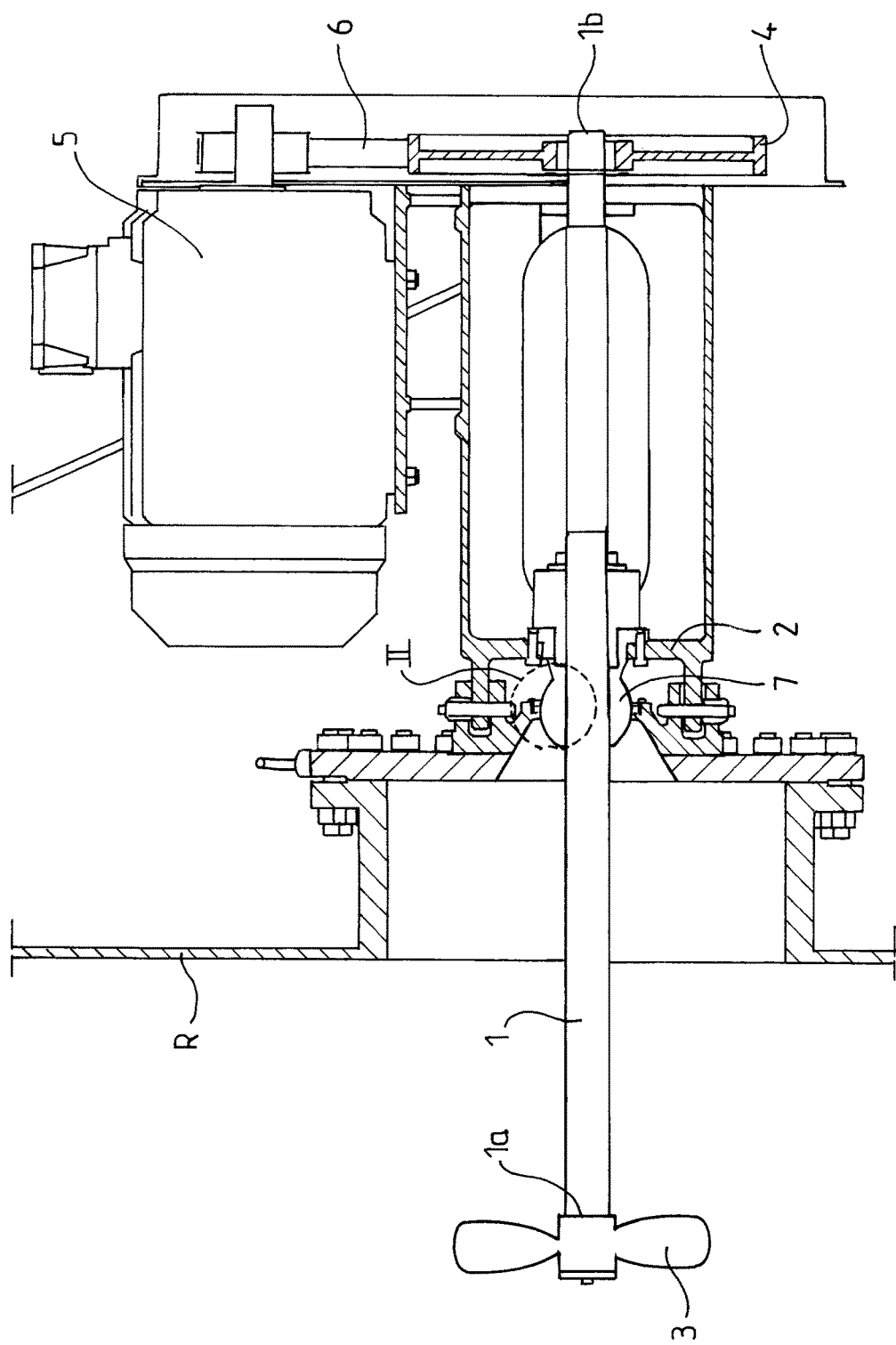

(51) Int. Cl.
*B01F 15/00* (2006.01)
*F16J 15/06* (2006.01)

(52) U.S. Cl.
CPC .. *B01F 15/00681* (2013.01); *B01F 15/00922* (2013.01); *F16J 15/061* (2013.01); *B01F 2015/0011* (2013.01); *B01F 2015/00097* (2013.01)

(56) References Cited

U.S. PATENT DOCUMENTS

| | | | | |
|---|---|---|---|---|
| 3,356,333 A | * | 12/1967 | Scaramucci | F16K 5/0642 251/172 |
| 3,445,087 A | * | 5/1969 | Davies | F16K 5/0636 251/172 |
| 3,773,336 A | * | 11/1973 | Walter | B63H 23/36 277/551 |
| 4,198,373 A | * | 4/1980 | Kropp | B01F 15/00681 277/370 |
| 4,319,756 A | | 3/1982 | Brown | |
| 4,383,768 A | * | 5/1983 | Kupka | B01F 15/00922 277/370 |
| 4,753,534 A | * | 6/1988 | Markle | B01F 15/00 277/358 |
| 5,193,908 A | * | 3/1993 | Rescorla | B01F 7/24 261/119.1 |
| 5,609,831 A | * | 3/1997 | Kempter | B01F 7/18 264/211.21 |
| 5,836,690 A | * | 11/1998 | Davis | B01F 7/00258 366/325.2 |
| 6,098,990 A | | 8/2000 | Marnot | |
| 7,354,046 B2 | * | 4/2008 | Ramsay | B63H 23/321 277/551 |
| 2002/0118596 A1 | * | 8/2002 | Mizutani | A61B 17/8825 366/189 |
| 2004/0156968 A1 | * | 8/2004 | Fisson | A21C 1/006 426/549 |

FOREIGN PATENT DOCUMENTS

WO 2014/070469 A1 5/2014
WO WO-2014070469 A1 * 5/2014 ........... F16J 15/3216

* cited by examiner

SYSTEM FOR REMOVING SEALING FROM A BALL JOINT

The present invention relates to a stirring device comprising a stirring blade shaft driven by drive means, the stirring blade shaft being guided with respect to a body by a bearing, the stirring device further comprising a seal secured to the body and in contact with the ball joint so as to seal against the fluid that is to be stirred.

The storage of petrochemical products, whether these being crude or refined, for large-capacity storage tanks in most instances requires stirrers, commonly referred to as side entry stirrers, having an orientation system. This system is based on a pivot for mechanical guidance and a component of partially spherical shape acting as a support for a semi static seal. To achieve this sealing, a seal between the static part of the machine and the sphere is generally used. This seal is a wearing component that needs to be changed in a period of 1 to 5 years, preferably every 2 years.

The orientation system is essential for allowing large sized storage tanks to be stirred and for involving the entire volume for minimum power consumption. Since the volume of the storage tank may be as much 200000 $m^3$, emptying the tank during a servicing or maintenance operation is, especially in the event of a leak, highly complex because this operation takes several hours and may, for very large sized storage tanks, take as long as several days.

The substances mixed are generally hazardous and pollutant which makes potentially transferring them to a backup storage tank inconceivable both from a technical standpoint, since an additional storage tank of the same capacity is not necessarily available, and from an ecological stand point, given the risk of product leaking during the transfer.

Replacing this seal is therefore tricky and problematical when the tank is full or when the liquid level is above the point at which the stirrer is installed. Maintaining and replacing the seal is an operation that is costly in terms of time and in terms of energy and complex to implement if the user has to halt production and drain the storage tank.

According to the prior art, the sealing system predominantly used is braid. The system accommodating the seal is a seal body which is standard for this application. The system accommodating the seal may form part of the body of the machine or may be independent and is not necessarily mobile.

Changing a seal, which is a device which is comparatively inexpensive in comparison with the other components of the equipment, requires the emptying of the tank, the removal of delicate precision-fitted mechanical components, and the adjustments require skilled labor.

This equipment is used in the vicinity of refined oil production and the use of the oil for the production of chemical products, and therefore in dangerous zones where the labor is generally fairly unskilled.

There is therefore a need for a more satisfactory solution that allows the seal to be changed without emptying the storage tank, that limits the intervention time and the complex operations that require a qualified operator.

According to the invention, a stirring device comprising a stirring blade shaft driven by drive means, the stirring blade shaft being guided with respect to a body by a bearing, the stirring device further comprising a seal secured to the body and in contact with the ball joint so as to seal against the fluid that is to be stirred, is characterized in that the seal is mounted on a seal support comprising a contact zone, the device comprising actuating means able to cause a translational movement of the ball joint and/or of the seal support along the axis of the stirrer blade shaft.

Advantageously, the seal support is able to adopt two positions, an operating first position in which the seal is in contact with the ball joint and a maintenance second position in which the contact zone is in contact with the ball joint.

As an alternative, the ball joint may be able to adopt two positions, an operating first position in which the seal is in contact with the ball joint and a maintenance second position in which the contact zone is in contact with the ball joint.

The seal support may comprise a proximal end in the vicinity of the fluid that is to be sealed against, ending in a shoulder and a contact zone.

The seal body may comprise an orifice for checking the static sealing.

Figure 2:
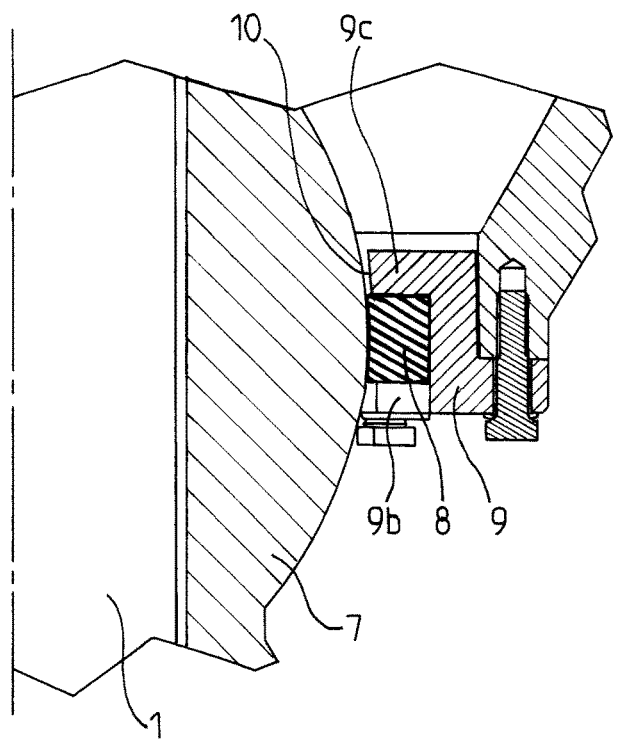
Figure 3:
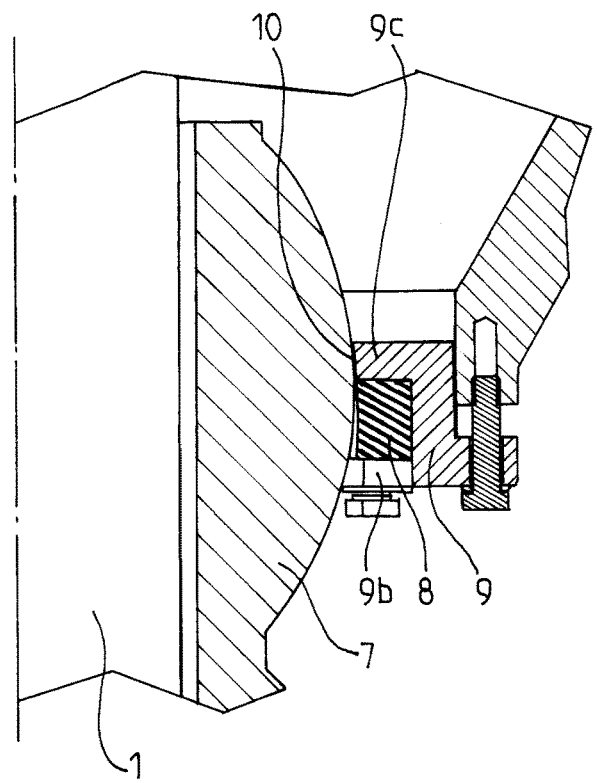

Further features and advantages of the invention will become apparent from the following description of one preferred embodiment with reference to the attached but non limiting drawings. In these drawings:

FIG. 1 is an overview in longitudinal section of a device according to the invention, FIG. 2 is a view in longitudinal section, on a larger scale, of a sealing device according to the invention in the operating position, and FIG. 3 is a longitudinal view in section, on a larger scale, of a sealing device according to the invention, in the maintenance position.

Throughout the description that follows of various embodiments of stirring blade according to the invention, relative terms such as "upper", "lower", "front", "rear", "horizontal" and "vertical" are to be interpreted as when the device according to the invention is installed in the operation situation.

FIG. 1 gives an overview of the various elements of the device according to the invention.

The device D comprises a stirring blade shaft 1 mounted on a bearing 2 via rolling bearings. The stirring blade shaft 1 comprises a first end 1a situated in contact with a fluid that is to be stirred, contained in a tank R, and on which a stirring blade 3 is mounted. The stirring blade shaft 1 also comprises a second end 1b on which there is mounted a pulley 4 that allows the stirring blade shaft 1 to be driven by a motor 5 and a belt 6.

Mounted near the end 1a is a ball joint 7 in sliding connection with the shaft 1. The transmission of torque between the shaft 1 and the ball joint 7 is afforded by splines or by a key-type device.

A sealing device of the lip seal type is mounted in a support 9 secured to the tank R and in contact with the ball joint 7 in such a way as to provide the sealing of the tank R.

FIGS. 2 and 3 show the mounting of a lip seal 8 in the support 9.

The support 9 comprises a cylindrical housing 9a in which the lip seal 8 is mounted. The cylindrical housing 9a has a distal end away from the fluid that is to be sealed against, comprising an opening 9b allowing the insertion and extraction of the seal 8. The cylindrical housing also has a proximal end near the fluid that is to be sealed against, comprising a shoulder 9c against which the seal 8 abuts.

The shoulder 9c ends in a contact zone 10 of substantially frustoconical shape.

The support 9 is held in place by retaining screws. Extraction screws allow the support 9 to be translated and extracted.

The static sealing system according to the invention consists in causing the seal to move with respect to its operating position. This movement is obtained either by moving the seal support with the latter axially with respect to the sphere, or by moving the sphere with respect to the seal.

According to the embodiment described here, the seal body 8 may be moved by the addition of an intermediate component, the support 9, which acts as a seal housing and which is itself sealed with respect to the bearing 2. The sliding mounting with retaining and extraction screws allows the system both to be kept in the operating portion and moved into the static sealing position. Sealing is afforded by contact between the spherical surface of the ball joint 7 and the contact zone 10. The pressure generated by the extraction screws and the pressure in the storage tank allow the system to be held in place for maintenance.

Once the static sealing position is reached, it is necessary to ensure correct sealing of the auxiliary system before the seal 8 is removed, so as to avoid any risk of leaks or sprays into the environment or over the operator. This safety feature is obtained by an orifice pierced in the seal body which allows the pressure between the seal 8 and the static sealing system to be checked. A valve on this orifice makes it possible to verify that sealing is correct. If not, additional load has to be reapplied to the extraction screws.

Once this verification has been made, the operator may continue his maintenance operation.

During seal maintenance, the operations are as follows:

The machine may or may not be stopped.

The static sealing position is obtained: this is an operation that can be performed without special tooling and that has an intervention time of under 15 minutes and, in general, of around 7 minutes.

The sealing is checked: by opening a valve.

The seal retaining system is removed: this is an operation performed without special tooling and with an intervention time of under 5 minutes and in general of around 1 minute.

The old seal is extracted: intervention time of under 5 minutes, generally around 3 minutes.

The new seal is fitted without special tooling. Intervention time of under 15 minutes and in general of around 7 minutes.

The seal retain is refitted, the valve is closed, the static sealing system is returned to the operation condition, the sealing of the replaced seal is checked. Intervention time of under 20 minutes, generally of around 15 minutes.

The total time needed for this operation is on average 35 minutes and does not exceed 50 minutes.

Compared with the existing seals and the system accommodating these seals, the maintenance time is very much reduced. Moreover, there is no need to empty the tank which is something that may take several days in the case of large sized tanks.

The device according to the invention has required the development of novel solutions but offers numerous advantages.

In particular, it may be noted that the device according to the invention is easy to fit and that the bulkiness is maintained by comparison with existing devices. The objective of allowing the seal to be replaced with the storage tanks still full is achieved and, what is more, an ability to verify that the system has been made safe before dismantling has been obtained. Furthermore, this technical solution is not excessively limiting in terms of the choice of materials, thereby allowing better product/method compatibility.

It will be noted that this device is not restricted to the use of a ball joint. The component 7 may also have some other shape, notably an ovoid shape.

The invention claimed is:

1. A stirring device (D) comprising:
   a stirring blade shaft (1) driven by drive means,
   the stirring blade shaft (1) being guided with respect to a body by a bearing,
   a ball joint (7) mounted at the stirring blade shaft (1), the ball joint (7) having a spherical surface,
   a seal support (9) of a first material, the seal support (9) located in a vicinity of fluid that is to be stirred and sealed against, the seal support (9) having a part comprised of the first material and defining a contact zone (10) for contact between the spherical surface of the ball joint (7),
   a seal (8) secured to the body and in contact with the ball joint (7) so as to seal against the fluid that is to be stirred, wherein the seal (8) is mounted on the seal support (9) comprising the contact zone (10), and
   actuating means able to cause a translational movement of the ball joint (7) and/or of the seal support (9) along the axis of the stirrer blade shaft (1) to thereby provide for sealing to be achieved through the contact between the spherical surface of the ball joint (7) and the contact zone (10) of the part of the seal support (9) upon said translation, while enabling removal and replacement of the seal (8).

2. The stirring device (D) as claimed in claim 1, wherein the seal support (9) is able to adopt two positions, an operating first position in which the seal (8) is in contact with the ball joint (7) and a maintenance second position in which the contact zone (10) is in contact with the ball joint (7).

3. The stirring device (D) as claimed in claim 1, wherein the ball joint (7) is able to adopt two positions, an operating first position in which the seal (8) is in contact with the ball joint (7) and a maintenance second position in which the contact zone (10) is in contact with the ball joint (7).

4. The stirring device (D) as claimed in claim 2, wherein the part comprising the contact zone (10) of the seal support (9) is a proximal end of the seal support (9) in the vicinity of the fluid that is to be sealed against, the proximal end ending in a shoulder (9c) that ends with the contact zone (10), the contact zone (10) being of substantially frustoconical shape that in the maintenance second position contacts the spherical surface of the ball joint (7) to thereby seal against the fluid.

5. The stirring device (D) as claimed in claim 1, wherein the seal includes a seal body which comprises an orifice for checking static sealing.

6. The stirring device (D) as claimed in claim 2, wherein the seal includes a seal body which comprises an orifice for checking static sealing.

7. The stirring device (D) as claimed in claim 3, wherein the seal includes a seal body which comprises an orifice for checking static sealing.

8. The stirring device (D) as claimed in claim 4, wherein the seal includes a seal body which comprises an orifice for checking static sealing.

9. The stirring device (D) as claimed in claim 2, further comprising extraction screws that allow the support (9) to be extracted toward its static sealing position.

10. The stirring device (D) as claimed in claim 3, further comprising extraction screws that allow the support (9) to be extracted toward its static sealing position.

11. The stirring device (D) as claimed in claim 4, further comprising extraction screws that allow the support (9) to be extracted toward its static sealing position.

12. The stirring device (D) as claimed in claim 5, further comprising extraction screws that allow the support (9) to be extracted toward its static sealing position.

13. The stirring device (D) as claimed in claim 6, further comprising extraction screws that allow the support (9) to be extracted toward its static sealing position.

14. The stirring device (D) as claimed in claim 7, further comprising extraction screws that allow the support (9) to be extracted toward its static sealing position.

15. The stirring device (D) as claimed in claim 8, further comprising extraction screws that allow the support (9) to be extracted toward its static sealing position.

16. The stirring device (D) as claimed in claim 2, wherein the contact zone (10) of the seal support (9) is at a proximal end of the seal support (9) ending in a shoulder (9c) that includes the contact zone (10), the contact zone (10) being of a frustoconical shape.

17. A stirring device (D), comprising:
- a tank (R);
- a bearing (2) located on a machine body;
- a stirring blade shaft (1) mounted on the bearing and driven by drive device,
- the stirring blade shaft comprises a first end (1a) on which the stirring blade (3) is mounted, the stirring blade being situated to be in contact with a fluid that is to be stirred, the fluid being contained in the tank (R),
- the stirring blade shaft further comprises a second end (1b) operatively connected to the drive that drives the stirring blade shaft;
- a ball joint (7) in sliding connection with the stirring blade shaft, a connection between the stirring blade shaft and the ball joint providing a transmission of torque between the stirring blade shaft and the ball joint the ball joint (7) having a spherical surface;
- a seal support (9) of a first material having a proximal end of the first material and defining a shoulder comprising a contact zone (10) of a frustoconical shape, the seal support (9) being secured to the tank (R) and in contact with the ball joint (7);
- a seal (8) with a body mounted on the seal support (9) so that the seal (8) is held by the seal support (9) with the contact zone (10) of the shoulder in contact against the spherical surface of the ball joint (7) so as to seal against the fluid that is to be stirred; and
- an actuator that causes a translational movement of one of the group consisting of the ball joint (7) and the seal support (9), the translational movement being along an axis of the stirrer blade shaft (1) to thereby, through said translational movement, provide sealing to be achieved through the contact between the spherical surface of the ball joint (7) and the contact zone (10) of the frustoconical shape of the shoulder defined by the proximal end of the seal support (9), while enabling removal and replacement of the seal (8).

18. The stirring device (D) of claim 17, wherein extraction screws hold the seal support (9) in place against the tank (R), the seal support (9) being able to adopt a first position and a second position, the first position being an operating position in which the seal (8) is in contact with the ball joint (7) and the second position being a maintenance position in which the contact zone (10) is in contact with the ball joint (7), operation of the extraction screws allowing the seal support (9) to be translated to the maintenance position to allow the seal (8) to be extracted.

* * * * *